United States Patent [19]
Alvarez, II et al.

[11] Patent Number: 5,784,394
[45] Date of Patent: Jul. 21, 1998

[54] METHOD AND SYSTEM FOR IMPLEMENTING PARITY ERROR RECOVERY SCHEMES IN A DATA PROCESSING SYSTEM

[75] Inventors: Manuel Joseph Alvarez, II, Austin; Gary Dale Carpenter, Pflugerville, both of Tex.; Kai Cheng, Beaverton, Oreg.; Jeffrey Holland Gruger, Austin, Tex.; Jin Chin Wang, Sunnyvale, Calif.

[73] Assignee: International Business Machines Corporation, Armonk, N.Y.

[21] Appl. No.: 749,250

[22] Filed: Nov. 15, 1996

[51] Int. Cl.$^6$ .................... G06F 11/10; H03M 13/00
[52] U.S. Cl. .................................. 371/49.1; 371/48
[58] Field of Search ..................... 371/49.1, 49.2, 371/48, 51.1; 711/122

[56] References Cited

U.S. PATENT DOCUMENTS

| | | | |
|---|---|---|---|
| 3,905,023 | 9/1975 | Perpiglia | 340/172.5 |
| 4,096,567 | 6/1978 | Millard et al. | 364/200 |
| 4,672,537 | 6/1987 | Katzman et al. | 364/200 |
| 4,942,578 | 7/1990 | Nakamura | 371/36 |
| 4,965,717 | 10/1990 | Cutts, Jr. et al. | 364/200 |
| 5,123,101 | 6/1992 | Sindhu | 395/400 |
| 5,155,843 | 10/1992 | Stamm et al. | 395/575 |
| 5,283,876 | 2/1994 | Tague | 395/400 |
| 5,347,648 | 9/1994 | Stamm et al. | 395/575 |
| 5,551,001 | 8/1996 | Cohen et al. | 711/122 |

Primary Examiner—Phung M. Chung
Attorney, Agent, or Firm—Richard A. Henkler

[57] ABSTRACT

A method and apparatus in a data processing system having a plurality of node controllers and a memory unit for each of the node controllers. Each one of the node controllers including at least one processor having a cache. Each memory unit including a plurality of entries each having an exclusive bit, an address tag, and an inclusion field. Each bit of the inclusion field representing one of the node controllers. The method and apparatus allow error recovery for errors occurring within the entries without using the ECC implementation. Specifically, two parity bits are used for detecting errors within an entry and logic for flushing any cache lines represented by the entry in error. The method and apparatus also includes means for detecting persistent errors and for indicating whether the error is generated by either hardware or software.

14 Claims, 3 Drawing Sheets

METHOD AND SYSTEM FOR IMPLEMENTING PARITY ERROR RECOVERY SCHEMES IN A DATA PROCESSING SYSTEM

BACKGROUND

1. Field of the Present Invention

The present invention generally relates to data processing systems, and more specifically, to data processing systems implementing parity error recovery schemes.

2. History of Related Art

In a traditional Symmetrical Multi-Processor (SMP) System data coherency is maintained by a relatively time consuming but effective procedure. For example, if a requester (e.g. a Central Processing Unit (CPU), or an Input/Output (I/O) unit in the same system) desired a particular portion of data (e.g. a cache line), it will first determine whether or not the desired data is located within its local cache. If the data is not within the local cache of the requester, then a Load Miss (or Read Miss) request is sent to a Memory Unit, which controls memory for the SMP system, requesting that the data be supplied to the CPU from the system memory.

The above noted data coherency process has been enhanced and improved through the use of directory-based Memory Units. A directory-based Memory Unit (Memory Unit), typically, includes a directory that indicates where the most recent valid copy of data is located. The valid copy of data can be located in either the system memory or one or more of the CPUs within the SMP.

Unfortunately, entries within the directory may become corrupt, and therefore, unreliable. Most systems today recover from such errors using the Error Correction Codes (ECC). The use of the ECC recovery in the directory, however, requires the use of many bits (i.e. 8 bits for 20 bits of address).

Further, current recovery systems also fail to provide a means for informing the recovery processor whether the error is a persistent or re-occurring one as well as whether the error is software or hardware driven.

It would therefore be a distinct advantage if a method and apparatus could provide a recovery for errors within the entries while using less bits than the ECC recovery method. It would be further advantageous if the method and apparatus could inform the recovery processor of persistent errors as well as identifying the error as either hardware or software driven. Thus, alleviating the consumption of large portions or all of the processing bandwidth for recovering from a hard fault. The present invention provides such a method and apparatus.

SUMMARY OF THE PRESENT INVENTION

In one aspect, the present invention is a method executing in a data processing system having a plurality of node controllers and a memory unit for each one of the node controllers. Each one of the node controllers having at least one processor having a cache. Each memory unit including a plurality of entries each including an exclusive bit, an address tag, an inclusion field, a first parity error bit, and a second parity error bit. Each bit of the inclusion field representing one of the node controllers. The method detecting errors in each of the entries.

The method includes the step of selecting the exclusive bit and a portion of the address tag for error detection using the first parity bit. The method also includes the step of selecting the remaining portion of the address tag and inclusion field for error detection using the second parity bit. The method further includes the step of detecting an error in one of the entries with the first and/or second parity bit. The method also includes the step of flushing the cache lines of the processors having data represented by the entry in error.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention, and are within the skills of persons of ordinary skill in the relevant art.

Figure 1:
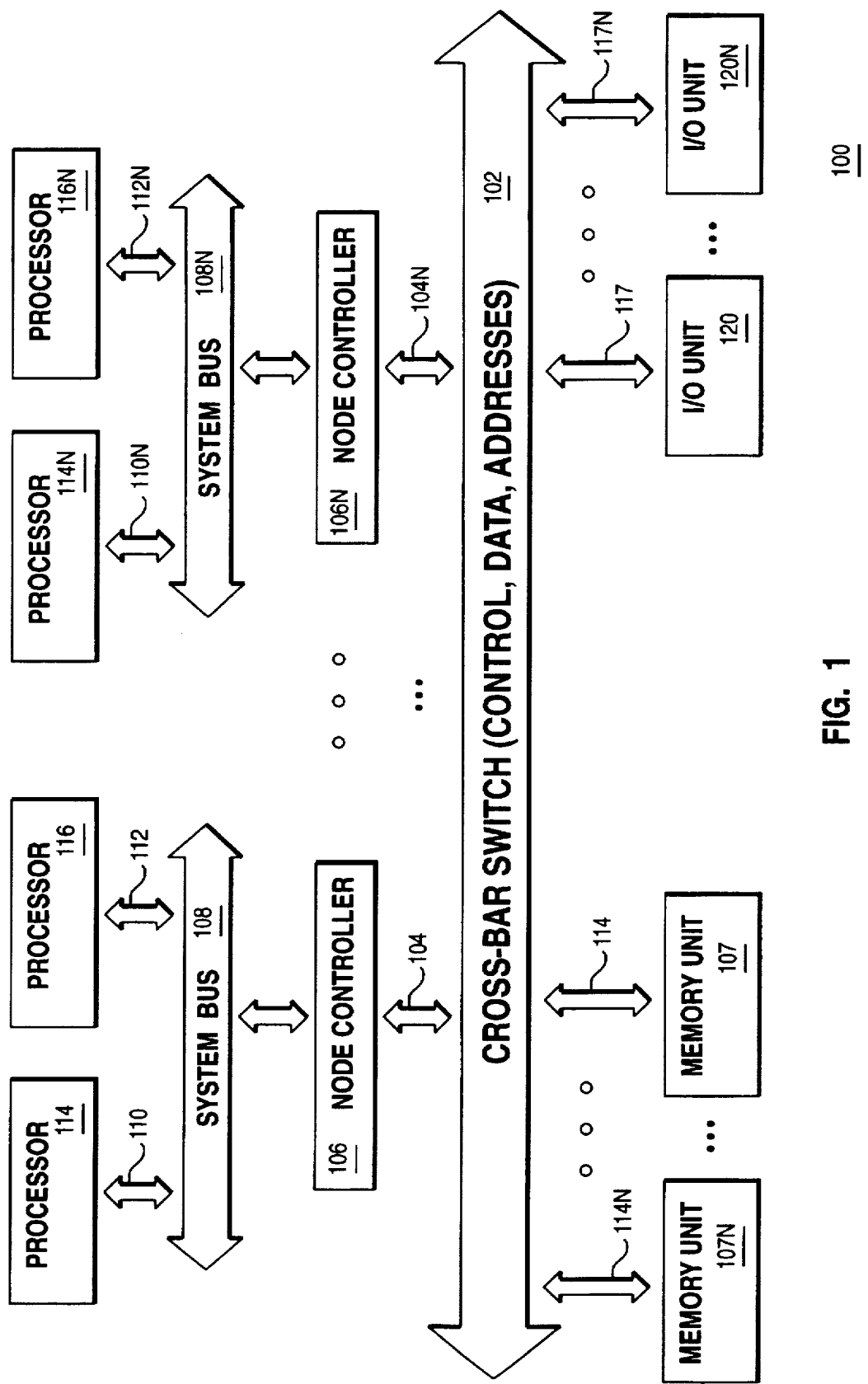
FIG. 1 is a schematic diagram illustrating a Symmetrical Multi-Processor system (SMP) 100 in which the present invention can be practiced.

Reference now being made to FIG. 1, a schematic diagram is shown illustrating a Symmetrical Multi-Processor system (SMP) 100 in which the present invention can be practiced. SMP 100 includes a Cross Bar Switch 102 for facilitating communication between a plurality of Memory Units 107–107n, I/O units 120–120n, and node controllers 106–106n via connections 114–114n, 117–117n and 104–104n, respectively. Node controller 106 is representative of node controllers 106a–106n. Consequently, discussions hereinafter concerning node controller 106 and its related components (system bus 108, processors 114 and 116) are equally applicable to node controllers 106a–106n.

In general, node controller 106 controls and communicates with processors 114 and 116 via the system bus 108 and connections 110 and 112, respectively. In the preferred embodiment of the present invention, each one of the node controllers 106–106n also has a corresponding Memory Unit 107–107n. It should be noted, however, that many other combinations of node controller to memory unit are equally applicable to the present invention. More specific information concerning the detailed structure of Memory Units 107–107n is discussed in connection with FIG. 2.

Figure 2:
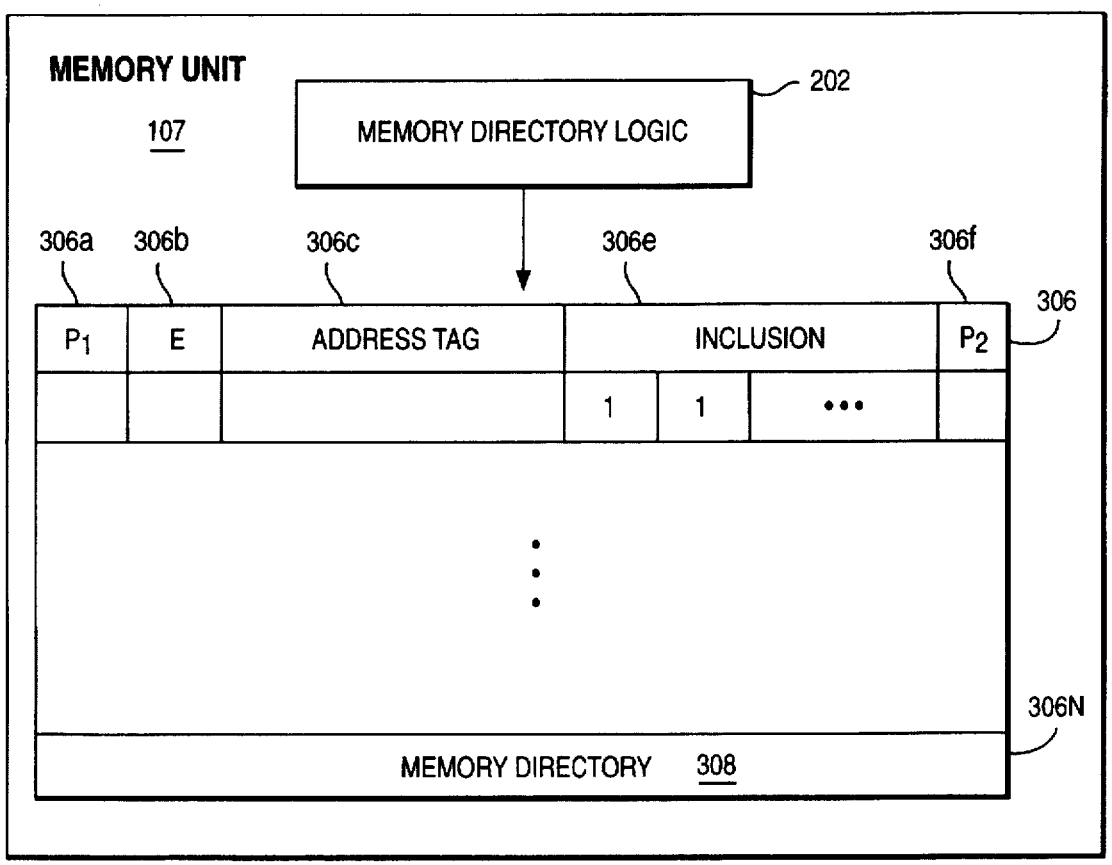
FIG. 2 is a schematic diagram illustrating in greater detail the Memory Unit of FIG. 1 according to the teachings of the present invention.

Reference now being made to FIG. 2, a schematic diagram is shown illustrating in greater detail the Memory Unit 107 of FIG. 1 according to the teachings of the present invention. Memory Unit 107 is representative of Memory Units 107a–107n. Consequently, the discussions hereinafter relating to Memory Unit 107 are equally applicable to Memory Units 107a–107n. Memory Unit 107 includes a Memory Directory Logic 202 and a Memory Directory 308. Memory Directory 308 includes a plurality of records (entries) 306–306n; each of which includes the following fields: parity bit one (P1) 306a, exclusive bit (E) 306b, Address Tag 306c, inclusion 306e, and parity bit two (P2) 306f.

In the preferred embodiment of the present invention, the fields of the Memory Directory are of the following lengths and arranged as indicated: bits 0–8 are for the Address Tag 306c field, bit 9 is for the parity bit one (P1) 306a field, bit 10 is for the exclusive bit (E) 306b field, bits 11–16 are for the inclusion 306e field, and bit 17 is for the parity bit two 306f field (P2).

The Address Tag 306c field is used for identifying the location at which the data associated with the corresponding entry 306–306n resides. The use of such Address Tag 306c fields is well known and understood by those of ordinary skill in the art, and therefore, further discussion is deemed unnecessary. The inclusion bit field 306e includes a bit for each one of the Node Controllers 106–106n. More specifically, the position of the bit within the inclusion bit field 306e has a direct correspondence with the particular Node Controller 106–106n represented.

For example, assume a six node controller embodiment constructed in a fashion similar to that of FIG. 1. The node controllers being designated as 106a–f. Further assume, that the inclusion bit field 306e has a binary value of 0001000. This value indicates that Node Controller 106a is using the data identified by the corresponding entry 306–306n. In further example, if the inclusion bit field 306e had a binary value of 011110, then Node Controller 106b–e is using the data identified by the corresponding entry 306–306n.

The exclusive bit (E) 306b is used for indicating whether the represented data is owned exclusively by one of the Node Controllers 106–106n as identified by the inclusion field 306e. In example, if the exclusive bit (E) 306b was set and the value of the inclusion field 306e was 00001, then node controller 106a would have exclusive control over the represented data. It should also be noted that by the definition of exclusivity only one node controller 106–106n at any time can ever have exclusive control over the represented data. Therefore, if the exclusive bit (E) 306b is set, then only one of the inclusion bits 306e can be set as well.

Parity bit one (P1) 306a is used for indicating an error within a selected portion of the Address Tag 306c field. In the preferred embodiment of the present invention, the selected portion represents six of the nine bits of the Address Tag 306c field. It should be noted, and those of ordinary skill in the art will readily recognize, that the selection of the total number of bits for error detection is dependent upon the particular application involved, and therefore, is not to be considered as a limitation thereto.

For the moment, it can be assumed that the left (i.e. 23-8) six bits of the Address Tag 306c are used as the selected portion for error detection. It should also be noted that the number of bits selected for error detection have a direct correspondence to the number of command issues to any one processor 114–114n, 116–116n for error detection. In the preferred embodiment, if an error is found in the data checked by P1 306a, the number of commands issues to any one processor 114–144n, 116–116n, would be 26, or 2 raised to the power or the number of Address Tag 306c bits being selected for error detection.

Parity bit two (P2) 306f is used for indicating an error within the inclusion field 306e and/or the remaining portion of the Address Tag 306c (i.e. bits 20-2). Using the same formula as numerated above for P1 306a, an error would cause eight commands to be issued to each processor 114–114n, and 116–116n. In the preferred embodiment, a P2 306f error must send these commands to all Node Controllers 106–106n (i.e. all processors 112–112n and 114–114n); whereas a P1 306a error only needs to send these commands to the Node Controllers 106–106n identified by the bits of the inclusion field 306e.

In the preferred embodiment of the present invention, an average of eight processors 112–112n, 114–114n(eight-way) is used for SMP system 100 (FIG. 1). Further, on an average only one of those eight processors 112–112n, 114–114nhas any data at a given period of time. In light of the above, the number of commands issued in the system 100 are minimized by selecting the bit portions of the Address Tag 306c for P1 306a and P2 306f. Specifically, P1=26=64*1 processor=64 commands P2=23=8*8 processors=64 commands Those skilled in the art will readily recognize that other embodiments would select their particular coverage based upon their particular system.

Figure 3:
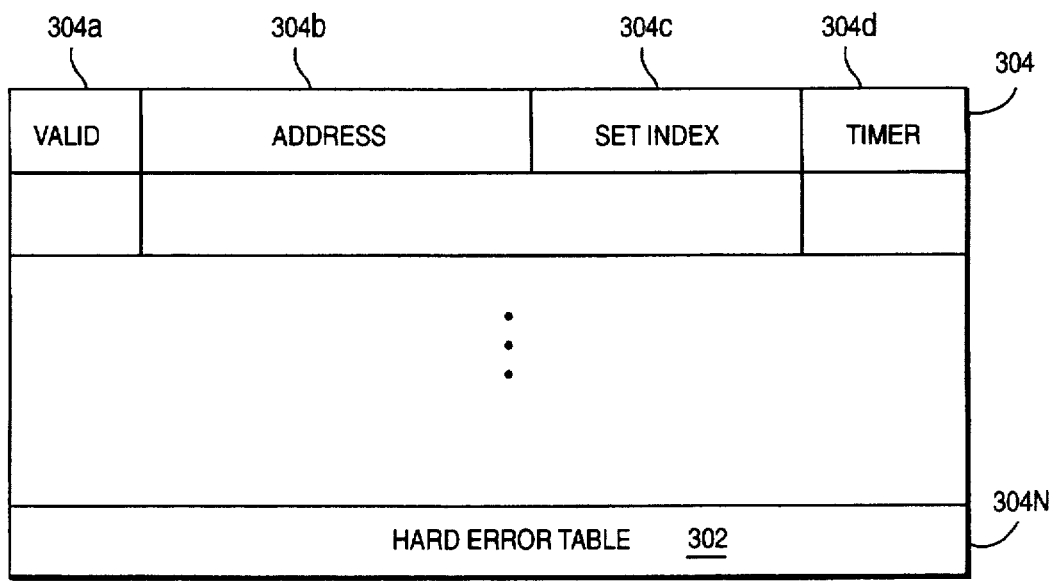
FIG. 3 is a block diagram illustrating a Hard Error Table used for indicating hardware errors that occur within the system of FIG. 1 according to the teachings of the present invention.

Reference now being made to FIG. 3, a block diagram is shown illustrating a Hard Error Table 302 used for indicating hardware errors that occur within the system 100 of FIG. 1 according to the teachings of the present invention.

One skilled in the art will readily recognize that the various fields 306a–306f can have varying lengths depending upon the particular application and system used. Consequently, the description provided hereinafter refers to specific lengths for each of the fields 306a–306f, but is not to be considered a limitation with respect to the present invention.

The Hard Error Table 302 includes a plurality of records 304–304n each of which are divided into the following four fields: valid 304a, address 304b, set index 304c, and timer 304d. In the preferred embodiment of the present invention, the fields of the Hard Error Table 302 are of the following lengths and arranged as indicated: bit 0 Valid 304a, bits 1–18 Address 304b, bits 19–22 Set Index 304c, and bits 23–46 Timer 304d.

The Hard Error Table 302 is used for indicating whether or not a hard or soft error failure has occurred within the system 100. As parity errors occur, the Memory directory unit 107 compares the Address Tag 306c with each of the Address fields 304b of entries 304–304n to determine whether or not this error has occurred before. If a matching entry is found, then the Memory directory unit 107 reports an error to the system 100 processor (not shown), or operating system (not shown) that a hard failure has occurred in the SRAM directory. The faulted SRAM chip can be located by reading the address bits 304b. If, however, no matching entry 304–304n is found the memory directory unit 107 logs the error into the Hard Error Table 302. The logging process includes filling in the fields of entries 304–304n.

As noted in FIG. 3, each entry has a valid bit 304a and a timer 304c associated with it. The timer is activated the moment the entry is filled and continues to count until its value overflows resetting the valid bit 304a, thus indicating that the entry 304–304n is no longer valid.

In order to provide further clarification with respect to the use of the Hard Error Table 302, FIG. 3 is explained hereinafter in connection with the discussion of FIG. 4.

Figure 4:
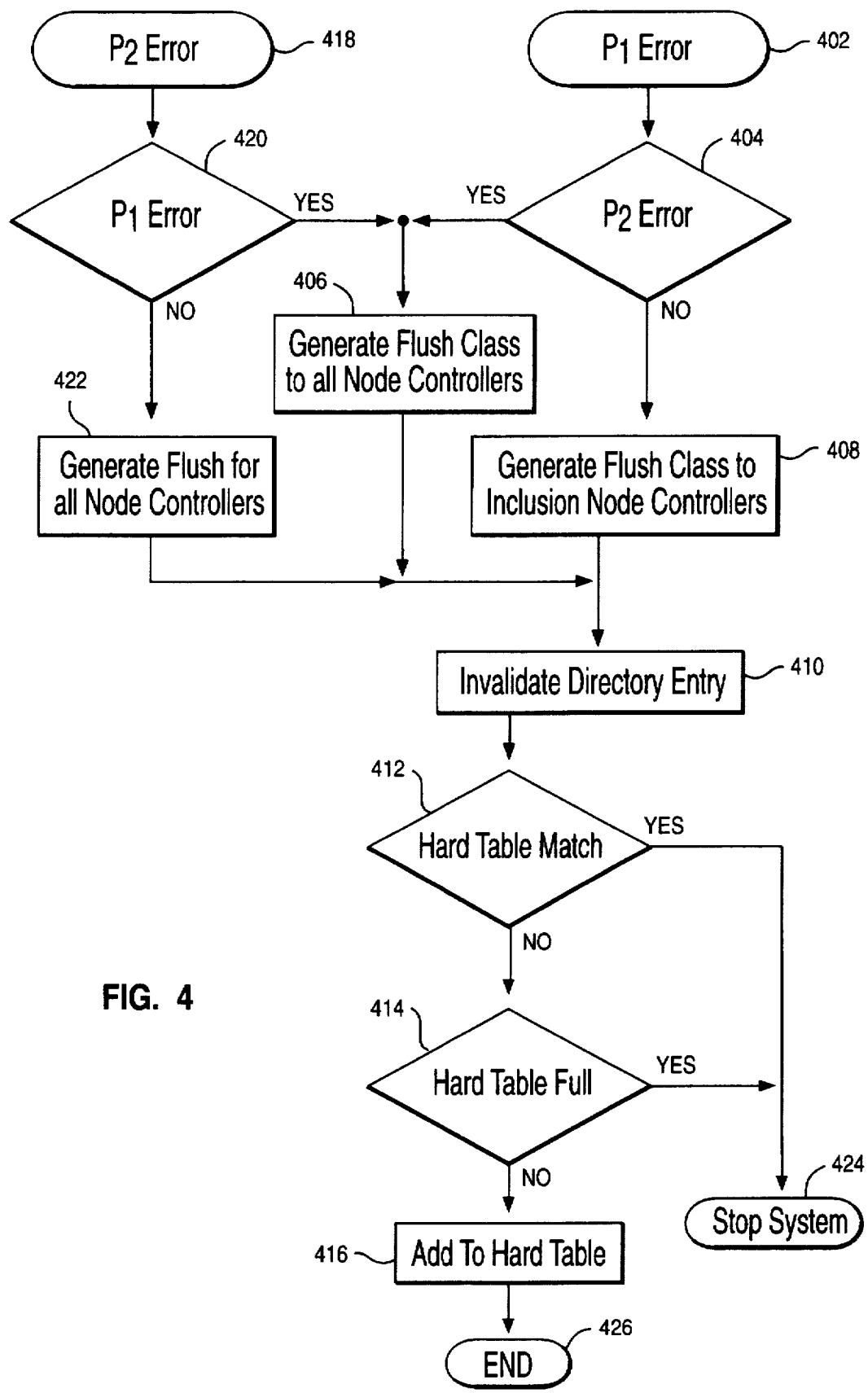
FIG. 4 is a flowchart illustrating the method used for recovering from errors that are detected by parity bits P1 and P2 of FIG. 2 according to the teachings of the present invention.

Reference now being made to FIG. 4, a flowchart is shown illustrating the method used for recovering from errors that are detected by parity bits P1 306a and P2 306f of FIG. 2 according to the teachings of the present invention. Depending upon which parity bit P1 306a or P2 306f is examined first, the flow of the method can proceed from either step 418 or step 402, respectively. The setting of parity bit one (P1) 306a indicates an error within bits 23–8 of the Address Tag field 306c. The setting of parity bit two (P2) 306f indicates an error in bits 20–2 of the Address Tag field 306c and/or one of the inclusion bits 306e.

Assuming that a P2 306f error is detected, the method begins at to step 418, and proceeds to step 420 to determine whether or not a P1 306a error has also occurred. If at step 420, it is determined that parity bit one 306a indicates an error (i.e. set), then the method proceeds to step 406. If, however, at step 420, it is determined that parity bit one 306a does not indicate an error, then the method proceeds to step 422.

At step 422, the cache line address corresponding to the entry 306–306n having the error is constructed by combining the Address Tag 306c with the portion of the Tag checked by parity bit 1 (P1) 306a, hereinafter referred to class I. Unfortunately, due to the detected error, the Memory Unit 107 is unable to identify which processor(s) which generated the error (i.e. the particular cache line containing the data). Consequently, the Memory Unit 107 will broadcast a command to all the Node Controllers 106–106n to purge any cache line in class I. Thereafter, the method proceeds to step 410.

If a P1 error is detected first, however, the method proceeds to step 402. Thereafter, the method proceeds to step 404 where it is determined whether or not a parity bit two 306f has also occurred. If, at step 404, it is determined that a parity bit two 306f is set, then a P2 error has occurred and the method proceeds to step 406. If, however, at step 404, it is determined that parity bit two 306f is not set, then no P2 error has occurred. Consequently, the method then proceeds to step 408.

At step 406, since it has been determined that both a parity one 306n and a parity two 306f error has occurred, the Memory Unit 107 broadcast commands to all processor nodes 106–106n to purge all class I and II (Address Tag 306c with the portion of the tag checked by P2 306f) addresses. Thereafter the method proceeds to step 410.

At step 408, the class of the cache line address having the error can be constructed by combining the Address Tag 306c with the portion of the tag checked by P2 306f, hereinafter referred to as class II. The Memory Unit 107 will then broadcast a command to all the processor nodes 106–106n that are indicated in the inclusion field 306e, to purge any cache line in class II. Thereafter, the method proceeds to step 410. At step 410, the erred entry 306–306n is invalidated, and the method proceeds to step 412.

At step 412, the Hard Error Table 302 (FIG. 3) is examined to determine whether or not this error has previously occurred. If, at step 412, a match for the error is found in the Hard Error Table 302 (i.e. a previous occurring error), then the method proceeds to step 424 where the system 100 is stopped. If, however, at step 412, a hard error table 302 match is not found (i.e. a first occurring error), then the method proceeds to step 414.

At step 414, it is determined whether or not the hard error table 302 has been filled to capacity (i.e. full). If, at step 414, it is determine that the Hard Error Table 302 is full, then the method proceeds to step 424 where the system 100 is once again stopped. If, however, at step 414, it is determined that the hard error table 302 is not full, then an entry is added to the hard error table for the error that has just occurred. The method then proceeds to end at step 426.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. In a data processing system having a plurality of node controllers and a memory unit for each one of the node controllers, each one of the node controllers having at least one processor having a cache, each memory unit including a plurality of entries each having an exclusive bit, an address tag, an inclusion field, a first parity error bit, and a second parity error bit, each bit of the inclusion field representing one of the node controllers, a method of detecting errors in each of the entries, the method comprising the steps of:

selecting the exclusive bit and a portion of the address tag for error detection using the first parity bit;

selecting the remaining portion of the address tag and inclusion field for error detection using the second parity bit;

detecting an error in one of the entries with the first and/or second parity bit; and flushing the cache lines of the processors having data represented by the entry in error.

2. The method of claim 1 wherein the step of detecting an error includes the step of:

detecting an error in one of the entries with the first parity bit.

3. The method of claim 2 wherein the step of flushing includes the steps of:

generating the address represented by the entry in error; and instructing the node controllers identified by the bits of the inclusion field of the entry in error to flush any cache lines having the generated address.

4. The method of claim 3 wherein the step of detecting an error includes the step of:

detecting an error in one of the entries with the second parity bit.

5. The method of claim 4 wherein the step of flushing includes the steps of:

generating the address represented by the entry in error; and instructing all of the node controllers to flush all cache lines having the generated address.

6. The method of claim 1 wherein the step of detecting an error includes the step of:

detecting an error in one of the entries with the second parity bit.

7. The method of claim 6 wherein the step of flushing includes the steps of:

generating the address represented by the entry in error; and instructing all of the node controllers to flush all cache lines having the generated address.

8. In a data processing system having a plurality of node controllers and a memory unit for each one of the node controllers, each one of the node controllers having at least one processor having a cache, each memory unit including a plurality of entries each having an exclusive bit, an address tag, an inclusion field, a first parity error bit, and a second parity error bit, each bit of the inclusion field representing one of the node controllers, an apparatus for detecting errors in each of the entries, the apparatus comprising:

means for selecting the exclusive bit and a portion of the address tag for error detection using the first parity bit;

means for selecting the remaining portion of the address tag and inclusion field for error detection using the second parity bit;

means for detecting an error in one of the entries with the first and/or second parity bit; and means for flushing the cache lines of the processors having data represented by the entry in error.

9. The apparatus of claim 8 wherein the means for detecting an error includes:

means for detecting an error in one of the entries with the first parity bit.

10. The apparatus of claim 9 wherein the means for flushing includes:

means for generating the address represented by the entry in error; and means for instructing the node controllers identified by the bits of the inclusion field of the entry in error to flush any cache lines having the generated address.

11. The apparatus of claim 10 wherein the means for detecting an error includes:

means for detecting an error in one of the entries with the second parity bit.

12. The apparatus of claim 11 wherein the means for flushing includes:

means for generating the address represented by the entry in error; and means for instructing all of the node controllers to flush all cache lines having the generated address.

13. The apparatus of claim 9 wherein the means for detecting an error includes:

means for detecting an error in one of the entries with the second parity bit.

14. The apparatus of claim 13 wherein the means for flushing includes:

means for generating the address represented by the entry in error; and means for instructing all of the node controllers to flush all cache lines having the generated address.

* * * * *